(12) United States Patent
Hossieny et al.

(10) Patent No.: US 11,739,190 B2
(45) Date of Patent: Aug. 29, 2023

(54) PROCESS FOR FORMING POLYLACTIDE EXPANDED BEAD FOAM

(71) Applicant: NatureWorks LLC, Minnetonka, MN (US)

(72) Inventors: Nemat Hossieny, Medina, MN (US); Manuel A. W. Natal, Eden Prairie, MN (US)

(73) Assignee: NatureWorks LLC, Plymouth, MN (US)

( * ) Notice: Subject to any disclaimer, the term of this patent is extended or adjusted under 35 U.S.C. 154(b) by 382 days.

(21) Appl. No.: 17/266,195

(22) PCT Filed: Aug. 21, 2019

(86) PCT No.: PCT/US2019/047388
§ 371 (c)(1),
(2) Date: Feb. 5, 2021

(87) PCT Pub. No.: WO2020/046657
PCT Pub. Date: Mar. 5, 2020

(65) Prior Publication Data
US 2021/0292510 A1     Sep. 23, 2021

Related U.S. Application Data

(60) Provisional application No. 62/725,290, filed on Aug. 31, 2018.

(51) Int. Cl.
| | | |
|---|---|---|
| *C08J 9/32* | (2006.01) | |
| *C08J 9/12* | (2006.01) | |
| *C08J 9/232* | (2006.01) | |
| *C08J 9/00* | (2006.01) | |

(52) U.S. Cl.
CPC ............ *C08J 9/232* (2013.01); *C08J 9/0061* (2013.01); *C08J 9/122* (2013.01); *C08J 2203/06* (2013.01); *C08J 2367/04* (2013.01)

(58) Field of Classification Search
CPC . C08J 9/232; C08J 9/0061; C08J 9/122; C08J 2203/06; C08J 2367/04; C08J 2467/04; C08J 9/16
See application file for complete search history.

(56) References Cited

U.S. PATENT DOCUMENTS

| | | |
|---|---|---|
| 9,023,470 B2 | 5/2015 | Shinohara |
| 9,206,296 B2 | 12/2015 | Shinohara |
| 2006/0039990 A1 | 2/2006 | Barrueta et al. |
| 2016/0039990 A1 * | 2/2016 | Park ........................ C08J 9/122 521/134 |

FOREIGN PATENT DOCUMENTS

| | | | |
|---|---|---|---|
| CN | 108948411 | * | 12/2018 |
| EP | 1683828 A | | 7/2006 |
| WO | 2013/181705 A | | 12/2013 |
| WO | 2014/037889 A | | 3/2014 |

OTHER PUBLICATIONS

Xue et al., J. Cellular Plastics 2018 54(1) 103-119.
Jia et al., Ind. Eng. Chem. Res. 2015 54, 2476-2488.

* cited by examiner

*Primary Examiner* — Irina S Zemel

(57) ABSTRACT

Expanded poly(lactide) (PLA) beads are made by pressurizing PLA beads with carbon dioxide at approximately room temperature, heating the beads under pressure to 90 to 160 C to saturate and partially crystallize the beads, and then depressurizing and cooling the beads. The PLA beads contain a blend of PLLA and PDLA in certain ratios. The beads are useful for making expanded bead foam.

13 Claims, No Drawings

PROCESS FOR FORMING POLYLACTIDE EXPANDED BEAD FOAM

This invention relates to a method for forming polylactide (PLA) expanded bead foam.

Bead foam is used to make lightweight plastic articles that are difficult to produce using other methods such as foam extrusion and injection molding. Unlike extrusion and injection molding processes, bead foam processes have few constraints as to the geometry of the product, and can produce much lower density foams.

Bead foam product is made by forming polymer beads that are infused with a blowing agent and then partially or fully expanded. The expanded beads are molded by pouring them into a mold and heating them enough to soften their surfaces and fuse ("sinter") them together to form a unitary mass.

PLA has to-date shown limited suitability for use in bead foaming processes. There are two main problems. The first is one of insufficient expansion. It has proven difficult to produce expanded PLA beads at the low densities seen when other polymers such as polystyrene and polypropylene are used. The other main problem is one of processing. Foaming conditions must be maintained within tight limits that are difficult to maintain consistently on industrial production lines. It has proven to be very difficult to obtain good sintering when making PLA bead foam without collapsing the beads. The resulting foamed products often have defects and inadequate mechanical properties.

US Published Patent Application No. 2016/003990 and U.S. Pat. No. 9,023,470 describe attempts to improve PLA bead foam processing. In these processes, the expanded PLA bead foams have a crystalline structure characterized by two melting ranges whose peaks are separated by about 5° to 25° C. in a DSC (differential scanning calorimetry) thermogram. This leads to some improvements, but the processing window during sintering remains small.

U.S. Pat. No. 9,206,296 describes an attempt to solve the processing issues by using PLA beads that have a core-shell structure. This does not represent a practical solution due to the difficulty and expense of producing the core-shell bead structure.

Xue et al., in *J. Cellular Plastics* 2018, vol 54(1), 113-119, describe a method of producing microcellular sheet foam from a mixture of a poly-L-lactic acid (PLLA) and a poly-D-lactic acid (PDLA). In this process, low crystallinity sheets are made from a blend of the PLLA and PDLA. The sheets are saturated with carbon dioxide at 0° C. at superatmospheric pressure. The carbon-dioxide-saturated sheets are depressurized while cold to prevent expansion. The sheets are thereafter expanded by immersing them in a liquid bath at 90° to 160° C. This process achieves a volumetric expansion ratio of up to about 25, which is still less than is wanted. No subsequent molding takes place because the starting material is a sheet rather than beads.

What is wanted is a process for producing expanded PLA bead foam, the process being characterized in being economically feasible and in producing high expansion ratios and foams in which the expanded beads are well-sintered and therefore have good mechanical properties.

This invention is a process for making expanded PLA beads, comprising:
(a) pressurizing unfoamed beads of a PLA resin blend having a crystallinity of no greater than 10 J/g as measured by DSC with carbon dioxide to a superatmospheric pressure while maintaining the temperature at or below the 40° C.;
(b) heating the pressurized unfoamed beads to a temperature between 90° C. and 160° C. to at least partially crystallize the PLA resin blend to form carbon-dioxide-saturated, partially crystallized, unfoamed beads; and then
(c) depressurizing the carbon-dioxide-saturated, unfoamed beads such that the carbon dioxide at least partially vaporizes to expand the beads; and then
(d) simultaneously and/or after step (c) cooling the expanded beads to below 40° C., wherein the PLA resin blend includes:
i) a first PLA polymer containing at least 88% L-lactic units based on the total weight of the first PLA polymer;
ii) a second PLA polymer containing at least 88% D-lactic units based on the total weight of the second PLA polymer;
the first and second PLA copolymers being present in the PLA resin blend at a weight ratio of 75:25 to 98:2 or 25:75 to 2:98.

The process is suitable for industrial application and provides for a high bead expansion ratio. The resulting expanded PLA foam therefore has a low density. Another advantage of the invention is that the entire expansion process can be carried out in a single production vessel.

The invention is in a second aspect expanded PLA beads made in the foregoing process.

The invention in a third aspect an expanded PLA bead comprising a blend of PLA resins, wherein the expanded PLA bead has a density of 0.025 to 0.35 g/cm$^3$ and a volume of 0.5 to 1500 mm$^3$, and the PLA resin blend contains PLA stereocomplex crystals having a crystalline peak melting temperature of 200-240° C. and PLA homocrystals having a peak melting temperature of 140-180° C.

The invention is also a method for producing a molded article, comprising introducing expanded PLA beads of the second or third aspect into a mold and sintering, and optionally further expanding, the expanded PLA beads to form the molded article. The molding process is characterized by a wide processing latitude, which simplifies operation and reduces defects.

The resin beads expanded in this invention to produce the bead foam are made from a PLA resin blend. The PLA resin blend is formed from at least two starting PLA resins, i.e., a first PLA resin and a second PLA resin.

For purposes of this invention, a PLA resin contains at least 90%, such as at least 95% or at least 98% by weight of lactic (—O—C(CH$_3$)—C(O)—) repeating units. These polymers are readily produced by polymerizing lactic acid or, more preferably, by polymerizing lactide.

The first PLA resin is a PLLA polymer containing at least 88% L-lactic units based on the total weight of the first PLA copolymer. The first PLA resin may contain at least 92%, at least 95%, at least 97%, at least 98%, or at least 99% L-lactic units, on the same basis. It may contain up to 100% L-lactic units. The remaining weight of the PLLA polymer, if any, may be D-lactic units. The first PLA resin may be a mixture of two or more polymers having the aforementioned proportions of L-lactic units.

The second PLA resin is a PDLA polymer containing at least 88% D-lactic units, based on the total weight of the first PLA copolymer. The second PLA resin may contain at least 92%, at least 95%, at least 97%, at least 98%, or at least 99% D-lactic units, on the same basis. It may contain up to 100% D-lactic units. The remaining weight of the PDLA polymer, if any, may be L-lactic units. The second PLA resin may be a mixture of two or more polymers having the aforementioned proportions of D-lactic units.

The first and second PLA resins each may have molecular weights that are high enough for melt processing applications. A number average molecular weight in the range of 20,000 to 150,000 g/mol, as measured by gel permeation chromatography against a polystyrene standard, is generally suitable, although somewhat higher and lower values can be used in some circumstances. The molecular weight of the high-D and high-L starting resins may be similar to each other (such as a number average molecular weight difference of 20,000 g/mol or less).

The first and second PLA copolymers are present in the PLA resin blend at a weight ratio of 75:25 to 98:2 or 25:75 to 2:98. Preferred weight ratios are 80:20 to 95:5 and 20:80 to 95:5.

The starting unfoamed beads are conveniently made by melt-blending the first and second PLA resin. A melt of the two resins is formed, preferably at a temperature equal to or above the peak melting temperature of PLA stereocomplex crystals (about 200° to 240° C.). The melt is solidified by cooling and simultaneously or thereafter formed into particles. It is preferred to perform the cooling step by rapidly reducing the temperature of the melted blend from at or above the stereocomplex melting temperature to below the glass transition temperature of PLA (about 60° C.), to minimize crystallization during the cooling process. The PLA blend in the particles preferably has a crystallinity of no greater than 10 J/g by DSC to pressurizing them with carbon dioxide. The DSC measurement is performed with a temperature increase from 0° to 270° C. at a rate of 50° C./minute.

A suitable way of forming beads from the PLA resin blend is to extrude the melt-blended resins into strands that are chopped to length as or after they are cooled and solidified. Note that for purposes of this invention, the beads are not necessarily spherical in shape. They may be, for example, cylindrical, ellipsoidal, or of other geometry. If cylindrical, the cross-section of the beads may be circular, elliptical, polygonal, or irregular. The beads should have an aspect ratio (ratio of longest to shortest orthogonal dimensions) of no more than 5, especially no more than 2.5, or no more than 1.5, as this facilitates good packing and the development of uniform properties in the final product.

The strand diameter and length of the chopped particles each may be, for example, 0.2 to 3 mm, especially at least 0.5 mm, and up to 2 mm, or up to 1.5 mm. Diameters for purpose of this invention are the diameter of a circle having the same cross-sectional area as the strand. The strands may be extruded into a cooling bath such as a water or other liquid bath to cool and solidify them rapidly to prevent significant crystallization from occurring before their temperature has been reduced to below the glass transition temperature. A suitable bath temperature is up to 40° C. or up to 30° C.

The starting particles are unfoamed prior to being pressurized with carbon dioxide in step a) of the process.

In step a), the PLA resin blend particles are pressurized with carbon dioxide. This step is performed by contacting the PLA resin beads with carbon dioxide under conditions that include a superatmospheric pressure and a temperature of no greater than 40° C. The pressure is preferably at least 1 MPa gauge and can be, for example, at least 3 MPa gauge, at least 4 MPa gauge, or at least 5 MPa gauge. The pressure may be, for example, up to 10 MPa gauge or up to 8 MPa gauge. The temperature may be, for example, at least −20° C. or at least 0° C. and may be up to, for example, 30° C. An especially preferred temperature is 15° C. to 30° C. The pressurization step typically takes up to 10 minutes.

Once the beads have been pressurized, they are heated under superatmospheric pressure to a temperature between 90° C. and 160° C. to at least partially crystallize the PLA resin blend without expanding the beads (step (b)). This heating step may be performed in a thermal fluid as described below. The superatmospheric pressure may be the same as in the pressurization step a). The beads may be held within this temperature range for a period, for example of at least 5 minutes or at least 10 minutes and, for example, up to 60 minutes, up to 30 minutes, or up to 20 minutes. A preferred temperature is 110° C. to 140° C., and an especially preferred temperature is 120° C. to 135° C. This step (b) produces carbon-dioxide-saturated, partially crystallized, unfoamed resin beads.

Two types of crystals form during the partial crystallization step (b). PLA stereocomplex crystals form when PLLA and PDLA crystallize together to form into a $3_1$ helical conformation. PLA stereocomplex crystals have peak melting temperatures (as measured by DSC) of approximately 200-240° C. In addition, PLA homocrystals form when either PLLA or PDLA (usually the one present in excess in the PLA resin blend) crystallizes with itself. PLA homocrystals are characterized by peak melting temperatures of approximately 140-180° C. As a result of the formation of these two types of crystals during the partial crystallization step, the partially crystallized particles exhibit two peak melting temperatures that are separated by approximately 20° to 100° C., and preferably 40 to 75° C.

The extent of crystallization that takes place during the partial crystallization step may be, for example, 5% to 50% of the total weight of the PLA resin blend in the particles. A preferred amount is 10% to 35% or 15% to 30% on the same basis. The extent of crystallization is determined by measuring the enthalpy of melting of the PLA stereocomplex and the PLA homocrystals in a weighed sample using DSC. A fully crystallized PLA stereocomplex is defined as having 124 J/g of stereocomplex crystals and a fully crystallized PLA homopolymer is defined as having 93 J/g of PLA homocrystals, in each case as measured by DSC. The extent of crystallization in the sample is therefore calculated as:

$$\text{Extent of crystallization} = 100\% \times \left[ \frac{Sc}{124 J/g} + \frac{Hc}{93 J/g} \right]$$

where Sc is the measured quantity of PLA stereocomplex crystallinity in Joules/gram and Hc is the measured quantity of PLA homocrystals in Joules/gram.

The PLA stereocomplex crystallinity may represent, for example, 5% to 90%, 10% to 80%, 10% to 50%, or 10% to 25% of the total crystallinity in the particles after the partial crystallization step as measured using DSC.

The pressure during the partial pressurization step is sufficient to prevent the particles from expanding until partial crystallinity has been produced in the particles as described above. Pressures as described with regard to the saturation step a) are suitable.

Step (b) produces partially crystallized, carbon-dioxide-saturated, unfoamed beads having a temperature of 90° C. to 160° C. In step (c), these beads are depressurized. The pressure is reduced such that the carbon dioxide infused into the beads at least partially vaporizes to expand the beads. The pressure may be reduced in the depressurization step to, for example, no greater than 500 kPa absolute, no greater than 250 kPa absolute, or no greater than 101 kPa absolute. The pressure reduction should take place rapidly, such as over a time period of 0.1 to 5 seconds.

The drop in pressure and vaporization of carbon dioxide expands the beads. The beads may expand to at least 4 times their original (pre-expanded) volume. An advantage of this invention, however, is that very large expansions are easily obtained. In some embodiments, the beads may expand to at least 20 times, at least 30 times, at least 35 times, or even at least 40 times their original volume. Bead densities after expansion may be, for example, from 0.025 to 0.35 g/cm$^3$. In preferred embodiments, the expanded beads have densities of 0.025 to 0.05 g/cm$^3$, especially 0.025 to 0.04 g/cm$^3$.

Some additional crystallization may take place during the expansion step due to strain-induced crystallization.

In step (d), the beads are cooled simultaneously and/or after the expansion step to below 40° C., preferably to below 30° C., to solidify them and produce a tack-free surface that prevents them from sticking prematurely.

Steps (a)-(c) can be performed in any vessel that can be pressurized to the requisite pressure and, with regard to step (b), withstand the requisite temperatures. Different apparatus can be used in the various steps, but it is preferred to perform at least steps (a)-(c) and preferably each of steps (a)-(d) in a single vessel. An autoclave or other pressure vessel is suitable.

Steps (a)-(c) may be performed while the beads are suspended in a thermal fluid. The thermal fluid can be, for example, water, an alkylene glycol, or polyalkylene glycol, a silicone oil, or other material that is a liquid under the temperature and pressure conditions of the various steps. Step (d) also may be performed with the beads suspended in the thermal fluid.

In a preferred process, the starting unfoamed beads are suspended in a thermal fluid in a vessel. The vessel is pressurized with carbon dioxide to saturate the beads and the beads are then heated, still within the vessel, to partially crystallize the PLA resin blend in the beads. The depressurization step is likewise performed in the same vessel by releasing the pressure.

The expanded beads, like the partially crystallized beads, are characterized in having both PLA stereocomplex crystals having peak melting temperatures of 200-240° C. and PLA homocrystals having peak melting temperatures of approximately 140-180° C. The extent of crystallization in the expanded beads again may be, for example, 5% to 35% of the total weight of the PLA resin blend in the particles.

The expanded beads are suitable for making molded articles in a bead molding process. In such a process the expanded beads are introduced into a mold, the internal walls of which define the dimensions and geometry of the part to be produced. The expanded beads are heated to soften their surfaces so adjacent beads adhere to form a unitary molded body. Some further expansion of the beads may take place during the molding step. It may be desirable, for example, to only partially expand the beads in step (c) above, so further bead expansion can take place during the molding process.

Bead molding can be performed, for example, in a steam chest molding machine. In such a device, the expanded or partially expanded beads are introduced into the mold, which is positioned in a steam cabinet. High-pressure steam is introduced into the cabinet to heat and soften the surfaces of the beads, which allows adjacent beads to fuse together.

An advantage of this invention is the wide processing latitude permitted through the use of the expanded beads made in accordance with the invention. Previously, bead molding of expanded PLA beads has been difficult because the steam temperature had to be controlled within a tight range. Because the steam temperature varies with its pressure, tight temperature control also requires careful control over the steam pressure, which is difficult using industrial-scale equipment.

Much broader temperature ranges (and therefore wider variations in steam pressure) can be tolerated with this invention. It is believed that the greater processing latitude is due at least in part to the presence of the two different types of crystals that form in the PLA resin blend, and the wide separation of their respective melting temperatures. Molding can be performed at any intermediate temperature and so close temperature control is less important and the beads are easier to mold.

The expanded beads can be used to make foamed articles such as cups, plates, coolers and other thermal insulation, buoys and other flotation devices, shock absorbing devices such as automotive bumper components, and the like.

The following examples are provided to illustrate the invention, but are not intended to limit the scope thereof. All parts and percentages are by weight unless otherwise indicated.

EXAMPLES 1 AND 2 AND COMPARATIVE SAMPLE A

PLA Blend 1 is made by melt blending 85% of a PLLA resin containing 95.5% L-lactic units and 4.5% D-lactic units and having a relative viscosity of about 4 g/dL with 15% of a PDLA having a weight average molecular weight of 70,000 g/mol (GPC, relative to polystyrene). Pellets of the starting resins are melted in a twin-screw extruder to a melt temperature, extruded through a strand die into a water bath where the strands are immediately quenched to a temperature below 40° C. The strands are chopped into spherical beads having a diameter of about 1 to 2 mm.

PLA Blend 2 is made in the same manner, but at a weight ratio of 95% PLLA and 5% PDLA.

Example 1 is made by expanding PLA Blend 1. Example 2 is made by expanding PLA Blend 2. Comparative Sample A is made by expanding pellets of the PLLA.

In each case the beads are expanded as follows: A 1-L autoclave is filled with 800 mL room temperature water. 20 g of the beads and 1 g of a suspension aid are added. The autoclave is sealed and pressured to 6 MPa gauge with carbon dioxide at room temperature. The contents of the sealed autoclave are then heated to 123-135° C. and held at that temperature for 15 minutes to saturate the beads with carbon dioxide and partially crystallize them. The autoclave is then depressurized to atmospheric pressure over several seconds. Cooling to room temperature takes place simultaneously with the depressurization.

In Example 1, the beads expand 4 to 5 times their original volume. In Example 2, the beads expand to about 40 times their original volume. SEM micrographs of the expanded Examples 1 and 2 reveal a uniform, regular cell structure. Comparative Sample A expands to 4 to 5 times its original volume. It has a highly irregular cell structure characterized by many large cells.

DSC thermographs are taken of the expanded beads. Example 1 is found to contain both PLA stereocomplex crystals (about 34 J/g) and about 7.7 J/g of PLLA homocrystals. Its total crystallinity is about 36%.

Example 2 is found to contain about 4 J/g of PLA stereocomplex crystals and about 21 J/g of PLLA homocrystals. Total crystallinity is about 26%.

Comparative Sample A contains only PLA homocrystals. Total crystallinity is about 17%.

Examples 1 and 2 sinter easily in a steam chest molding machine, at a range of temperatures between about 150° C. and 200° C., to produce moldings. Comparative Sample A, on the other hand, is molded with difficulty, with small variations in pressure and temperatures leading to the production of defects in the molded part.

What is claimed is:

1. A process for making expanded poly(lactide) bead foam, comprising:
   (a) pressurizing unfoamed beads of a PLA resin blend having a crystallinity of no greater than 10 J/g as measured by differential scanning calorimetry with carbon dioxide to a superatmospheric pressure while maintaining the temperature at or below the 40° C.;
   (b) heating the pressurized unfoamed beads to a temperature between 90° C. and 160° C. to at least partially crystallize the PLA resin blend to form carbon dioxide-saturated, partially crystallized, unfoamed beads; and then
   (c) depressurizing the carbon-dioxide-saturated, partially crystallized, unfoamed beads such that the carbon dioxide at least partially vaporizes to expand the beads; and then
   (d) simultaneously and/or after step (c), cooling the expanded beads to below 40° C., wherein the PLA resin blend includes:
   i) a first PLA polymer containing at least 88% L-lactic units, based on the total weight of the first PLA polymer;
   ii) a second PLA polymer containing at least 88% D-lactic units based on the total weight of the second PLA polymer;
   the first and second PLA copolymers being present in the PLA resin blend at a weight ratio of 75:25 to 98:2 or 25:75 to 2:98.

2. The process of claim 1 wherein the first PLA polymer contains at least 92% L-lactic units and the second PLA polymer contains at least 92% D-lactic units.

3. The process of claim 1 wherein the first PLA polymer contains at least 95% L-lactic units and the second PLA polymer contains at least 95% D-lactic units.

4. The process of claim 1 wherein the superatmospheric pressure in step (a) and the superatmospheric pressure in step (b) each is 3 MPa gauge to 10 MPa gauge.

5. The process of claim 4 wherein the temperature in step (b) is 110° C. to 140° C.

6. The process of claim 5 wherein in step (b) the pressurized unfoamed beads are maintained at a temperature of 110° C. to 140° C. for a period of 5 to 30 minutes.

7. The process of claim 1 wherein the carbon-dioxide-saturated, partially crystallized, unfoamed beads formed in step (b) have an extent of crystallization of 10% to 35% based on the total weight of the PLA resin blend in the beads, as measured by DSC.

8. The process of claim 1 wherein PLA stereocomplex crystals and PLA homocrystals form during step (b).

9. The process of claim 8 wherein the PLA stereocomplex crystals constitute 10% to 50% of the combined weight of the PLA stereocomplex crystals and PLA homocrystals.

10. The process of claim 1 wherein the first and second PLA copolymers are present in the PLA resin blend at a weight ratio of 85:15 to 98:2 or 15:85 to 2:98.

11. Expanded poly(lactide) beads made in the process of claim 1.

12. An expanded poly(lactide) bead comprising a cellular blend PLA resin blend, wherein the expanded poly(lactide) bead has a density of 0.025 to 0.35 g/cm$^3$ and a volume of 0.5 to 1500 mm$^3$, and the PLA resin blend contains PLA stereocomplex crystals having a crystalline peak melting temperature of 200-240° C. and PLA homocrystals having a peak melting temperature of 140-180° C.

13. A method for producing a molded article, comprising introducing expanded poly(lactide) beads of claim 12 into a mold and sintering and optionally further expanding the expanded poly(lactide) beads in the mold to form the molded article.

* * * * *